US005333319A

United States Patent [19]
Silen

[11] Patent Number: 5,333,319
[45] Date of Patent: Jul. 26, 1994

[54] VIRTUAL STORAGE DATA PROCESSOR WITH ENHANCED DISPATCHING PRIORITY ALLOCATION OF CPU RESOURCES

[75] Inventor: Stuart L. Silen, Morgan Hill, Calif.

[73] Assignee: International Business Machines Corporation, Armonk, N.Y.

[21] Appl. No.: 844,366

[22] Filed: Mar. 2, 1992

[51] Int. Cl.$^5$ ............................................. G06F 9/46
[52] U.S. Cl. ........................... 395/650; 364/DIG. 1; 364/280; 364/281.3; 364/281.6; 364/281.7; 364/281.8
[58] Field of Search ............................. 395/650, 700

[56] References Cited

U.S. PATENT DOCUMENTS

| | | | |
|---|---|---|---|
| 4,286,322 | 8/1981 | Hoffman et al. | 364/200 |
| 4,394,727 | 7/1983 | Hoffman et al. | 364/200 |
| 4,394,730 | 7/1983 | Suzuki et al. | 364/200 |
| 4,642,756 | 2/1987 | Sherrod | 364/200 |
| 4,736,318 | 4/1988 | Delyani et al. | 364/200 |
| 4,809,157 | 2/1989 | Eilert et al. | 395/650 |
| 4,908,750 | 3/1990 | Jablow | 364/200 |
| 4,943,913 | 7/1990 | Clark | 364/200 |
| 5,109,512 | 4/1992 | Bahr et al. | 395/650 |
| 5,257,375 | 10/1993 | Clark et al. | 395/650 |
| 5,276,876 | 1/1994 | Coleman et al. | 395/650 |

OTHER PUBLICATIONS

Brown et al., "Proportional Rate Scheduling Mechanism", IBM Technical Disclosure Bulletin, vol. 19, No. 11, Apr. 1977, pp. 4301-4304.

R. L. Abraham, "Priority Scheduling on a Multilevel Computer", IBM Technical Disclosure Bulletin, vol. 21, No. 11, Apr. 1979, pp. 4582-4583.

D. C. Solly, "Avoiding Deadlock In a Message-Passing Control Program", IBM Technical Disclosure Bulletin, vol. 28, No. 5, Oct. 1985, pp. 1941-1942.

Primary Examiner—Kevin A. Kriess
Attorney, Agent, or Firm—Perman & Green

[57] ABSTRACT

Dispatching improvements in operating systems are described for multiprogrammed data processing systems. A common priority dispatching mechanism for applications that span multiple address spaces in multi-address space operating systems is provided where multiple, dispatchable operating system processes operating in different address spaces but on behalf of a common application can all be dispatched at the same priority of the application rather than at the priority of the particular address space in which each individual process operates. The system further enables individual processes of a distributed application, that operate under different host operating systems in a connected complex to run at the common priority of the distributed application. High priority processes are given the capability to avoid becoming blocked by low priority processes for extended periods of time when serialization must occur on common resources in the system.

22 Claims, 6 Drawing Sheets

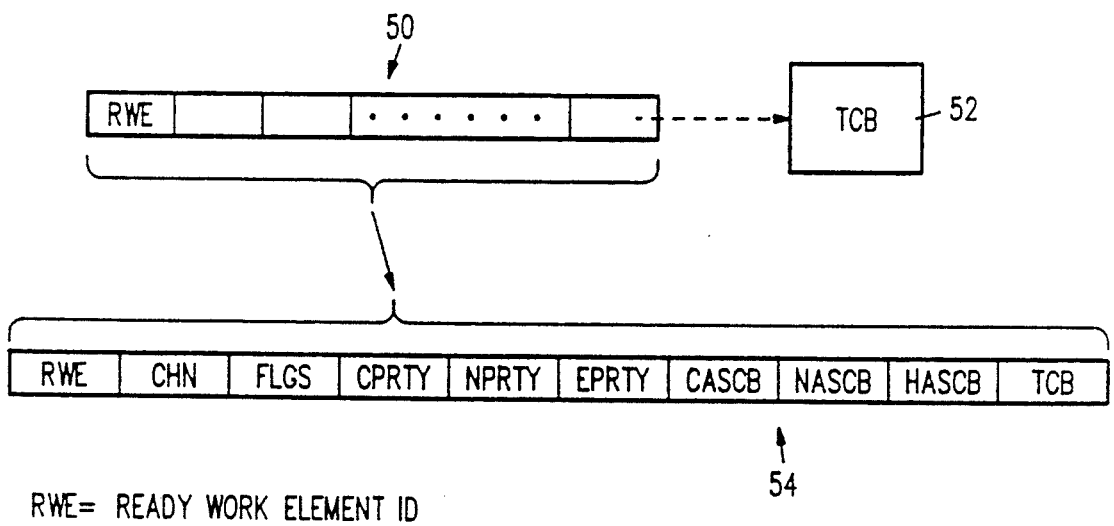

RWE= READY WORK ELEMENT ID
CHN= CHAIN FIELD (FOR DISPATCHER USE)
FLGS= STATUS FLAGS
CPRTY= CURRENT DISPATCHING PRIORITY WITHIN ADDRESS SPACE (OF TASK)
NPRTY= NORMAL DISPATCHING PRIORITY WITHIN ADDRESS SPACE (OF TASK)
EPRTY= ESCALATED DISPATCHING PRIORITY. WHEN SET, OVERRIDES CURRENT DISPATCHING AFFINITY AND FORCES AFFINITY TO MVS MASTER ASCB.
CASCB= CURRENT DISPATCHING AFFINITY (LATEST ASSIGNED AFFINITY)
NASCB= NORMAL DISPATCHING AFFINITY (INITIALLY ASSIGNED AFFINITY)
HASCB= HOME ADDRESS SPACE ASCB (ADDRESS SPACE OF DISPACHABLE UNIT)
TCB= TASK CONTROL BLOCK (THE DISPATCHABLE UNIT)

FIG. 3

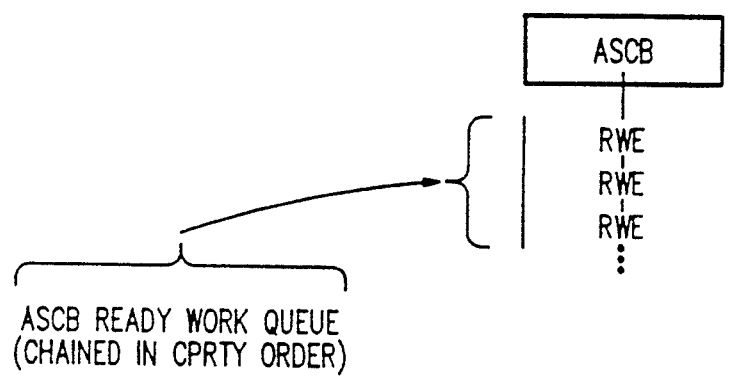

FIG. 4

VIRTUAL STORAGE DATA PROCESSOR WITH ENHANCED DISPATCHING PRIORITY ALLOCATION OF CPU RESOURCES

FIELD OF THE INVENTION

This invention relates to data processing systems which employ multiprogramming and, more particularly, to a system for enabling more effective allocation of CPU resources through improved task dispatching.

BACKGROUND OF THE INVENTION

Virtually all data processing systems employ operating systems for proper allocation and disposition of data processing resources and for the scheduling and management of work in the system. One of the more widely used operating systems is MVS, or "Multiple Virtual Storage". That operating system has been employed in the 370 and 390 series of computers marketed by the International Business Machines Corporation, assignee of this application. One feature of MVS is its ability to create variable size virtual storage areas and to allocate them to various users, tasks and resource suppliers. As is known, virtual storage gives programmers the appearance of a very large amount of storage at their disposal. Since most programs generally need only a fraction of main memory at any given time, portions of main memory (also called real storage) are allocated as necessary by the operating system to achieve efficient program execution. Underlying hardware maps addresses in virtual storage to locations in real storage, and automatically translates those addresses during program execution. When blocks of real storage (called pages) are determined to be not needed for immediate use, they are written out and saved on external storage media and the real storage frames are made available for use by other programs. The saved pages are later read back into real storage only when referenced by the associated program.

Such a system will be better understood by referring to FIG. 1 where it is assumed that two application programs (i.e., A and C) have been assigned virtual address spaces 10 and 12, respectively. The boxes indicated by numbers 10 and 12 are only for explanatory purposes and are not to be assumed as defining physical constraints.

Each virtual address space in MVS is represented by an Address Space Control Block (ASCB) that contains system data describing status of an associated virtual storage area. An ASCB will contain, for example, an indication of the assigned priority of its associated virtual address space and whether any work units within it are available for dispatch.

From an examination of FIG. 1, it can be seen that dispatchable work units B and D are assigned (by MVS) the priority of virtual address space 14, notwithstanding the fact that dispatchable unit B resulted from a work request originating out of virtual address space 10, while dispatchable unit D resulted from a work request originating out of virtual address space 12. For this example, virtual address space 10 is assigned an arbitrary low priority whereas virtual address space 12 is assigned an arbitrary higher priority. For work units B and D, those priorities are not considered by MVS since it automatically assigns to a dispatchable unit, the priority of the Home address space in which the unit of work executes. As a consequence, dispatchable units are dispatched only after their Home address space becomes the highest priority address space in the data processing system.

In general, dispatch of ready work units in MVS is carried out by a dispatcher component of the operating system. The priority by which control is routed to each ready work unit is controlled first by the priority assigned to the Home address space of each work unit and then by the position that work unit occupies in the linked list of Task Control Blocks (TCBs) chained from the ASCB for their Home address space. More specifically, work is dispatched in the following order:

1. Exits to routines having high priority because of specific conditions in the system.
2. SRBs that have global priority. An SRB (Service Request Block) is a system scheduler control block.
3. Ready address spaces in order of priority.
   (a) Local SRBs scheduled for execution to a chosen address space
   (b) Ready TCBs according to task priority within the chosen address space.

Underlying structures supporting priority dispatching in MVS include a linked list of ASCBs with ready work. The linked list is called the True Ready Queue. The position each ASCB occupies on this list is determined by its assigned address space priority. The first ASCB 32 shown on the True Ready Queue in FIG. 2 represents a system address space called the MVS "Master" address space which is given the highest address space priority in the system. Certain high priority, system level work is scheduled for execution in this address space. The Master address space is selected first by the dispatcher 30 whenever it has ready work to dispatch. When all ready work in the Master address space has been dispatched and completed, ASCB 32 for Master is removed from the True Ready Queue and the dispatcher selects the new highest priority address space having work ready for dispatch. This is shown as ASCB 16 in FIG. 2 where tasks TCB 18 and TCB 20 are found to be ready for dispatch. The dispatcher then selects and routes control to the ready TCB having the highest task priority within the address space represented by ASCB 16.

The intent of the MVS priority allocation system can be substantially frustrated where work from a high priority application is performed in an address space having a low priority. In such case, the work unit must wait for the low priority address space to become the highest priority awaiting dispatch, thus holding up further processing of the high priority application.

Other priority problems are present within MVS. Highly used system functions that serialize certain operations via locks (allow only one access at a time) are sometimes called by low priority users. When the low priority user accesses the highly used system function, a "lock" may be assigned to the low priority user temporarily blocking other users accessing the same system function. If the low priority user is interrupted while holding the "lock", the lock may not be freed and reassigned for an extended period of time, due to the low priority of the lock holder. During this time, higher priority users, also requesting services of the same system function, are placed on a queue and are suspended, pending availability of the lock. Thus, the use of locks can disrupt the normal processing flow intended by priority dispatching and may, in certain cases become a serious bottleneck in the system. In addition, where applications are distributed among various processors in a multi-processor arrangement, it is difficult, using MVS, to support a single, common dispatching priority for all component work units of the distributed application.

The prior art contains many different priority allocation schemes. In U.S. Pat. No. 4,394,730 to Suzuki et al., processors in a multiprocessor system are arranged in a predetermined priority sequence and, in response to an interrupt command, the system always directs a transferred job to a priority processor whose currently executing job is, in turn, transferred to a lower priority processor. In U.S. Pat. Nos. 4,286,322 and 4,394,727, both to Hoffman et al., prioritization schemes are described based on partitioning of high priority system work from other less important application work. System work is preemptive and is dispatched from a prime task dispatcher queue. Application work is non preemptive and is dispatched from non-prime (secondary) task dispatcher queues. In the '727 patent, Hoffman et al. describe a system where dispatching occurs from a single dispatching queue. A dispatcher is defined for each processor and is invoked in response to the queueing of an element in the dispatching queue. The dispatching queue is scanned for work having higher priority than currently is being processed by other processors. The dispatcher then signals the task dispatcher of a processor that is either idle, or running lower priority work to perform a task switch.

Sherrod, in U.S. Pat. No. 4,642,756, describes a scheduling and dispatching mechanism meant to deal with response/oriented applications such as real time or interactive processing, while also maximizing usage of the central processing unit and peripheral devices. The system deals with static, externally assigned priorities and internally assigned, dynamic priorities depending on the state of each task.

In U.S. Pat. No. 4,736,318 to Delyani et al., dispatching is based on task priority, with dispatched tasks running until they voluntarily give up control or run out of time within which the task may execute. The dispatch priority of a task is automatically adjusted up or down based on the behavior of the task (e.g., whether CPU bound or I/O bound), stopping higher priority CPU-bound tasks from completely blocking the execution of lower priority I/O bound tasks.

Jablow, in U.S. Pat. No. 4,908,750, describes a similar system to that described by Delyani et al., in that tasks that make requests for I/O or other services are given raised dispatching priority and are also given a complete execution time slice, (instead of the remaining time left from their interrupted interval). This compensates for voluntarily giving up the CPU and waiting for a requested event to complete.

Clark, in U.S. Pat. No. 4,943,913, describes a mechanism in MVS that provides easy accessibility to private storage in the home address of a currently dispatched execution unit, without having to modify CPU status or pointers to any other address spaces.

The following IBM Technical Disclosure Bulletin references also indicate various prior art priority schemes: Abraham, "Priority Scheduling on a Multi-Level Computer", IBM TDB, Vol. 21, No. 11, April 1979; Solly, "Avoiding Deadlock in a Message-Passing Control Program", IBM TDB, Vol. 28, No. 5, October 1985; and Brown et al., "Proportional Rates Scheduling Mechanism", IBM TDB Vol. 19, No. 11, April 1977.

Accordingly, it is an object of this invention to provide an improved dispatching priority system.

It is another object of this invention to provide an improved dispatching priority system which provides the capability for dispatchable units to be dispatched with the priority of the requesting task's originating address space.

It is yet another object of this invention to provide a dispatching priority system which assures that a lower priority task holding a lock will not seriously delay the processing of a higher priority task.

It is still another object of this invention to provide improved priority dispatching in a multiprocessing system where coupled individual processors cooperatively run under control of separate operating systems.

SUMMARY OF THE INVENTION

A computer system establishes virtual address spaces, each virtual address space having an associated address space control block (ASCB) and an assigned priority level. A resource manager (e.g., a data base manager) establishes a unit of work in a resource manager address space in response to a work request from a user address space. An encoded ready work element (RWE) for each unit of work is created by a control program, with the RWE including a dispatching affinity field indicating the user address space. When the unit of work is ready to be dispatched for execution within the resource manager address space, the ASCB associated with the requesting user address space is caused, by the control program, to indicate the RWE of the dispatchable unit. A dispatcher examines ASCB's that have dispatchable units and finds the RWE of the dispatchable unit at the priority of the requesting user address space (as contrasted to the resource manager address space), and thus dispatches the dispatchable unit at such user address space priority.

DESCRIPTION OF THE DRAWINGS

FIG. 3 illustrates the field assignments of a Ready Work Element that is associated with each task control block.

FIG. 4 is a schematic which indicates an ASCB's ready work queue.

DETAILED DESCRIPTION OF THE INVENTION

Figure 1:
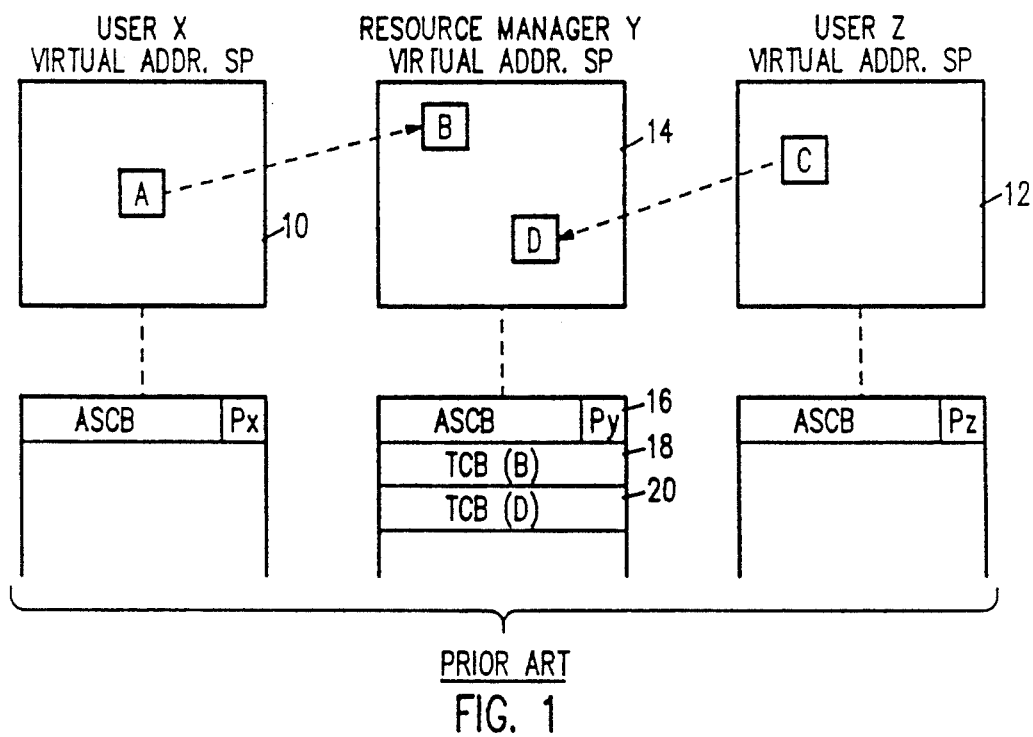
FIG. 1 is a schematic showing the relationship of dispatchable units and user and resource manager virtual address spaces and associated address space control blocks.

In this invention, for the purpose of task dispatching, units of work are "unbound" from the Home address space in which they execute. In other words, those units of work no longer automatically have attributed thereto the priority of the Home address space in which they execute. As indicated above, normally when a work unit in MVS is made ready for dispatch, it is associated with the ASCB representing the Home address space in which the dispatchable unit executes. This invention implements a new attribute for work units called "dispatching affinity" which dynamically establishes a dispatching association between any work unit and any ASCB in the operating system.

Dispatching affinity is implemented, in part, by means of a control block composed of a set of dispatcher fields. That control block is called a Ready Work Element (RWE). It is illustrated in FIG. 3 at 50. Each TCB 52 in the operating system has a unique RWE assigned. A new RWE is acquired and assigned to a TCB when it is initially created. The RWE remains allocated to the TCB during its existence and is freed at task termination when the related TCB is detached. The various fields of a RWE block are illustrated at 54, with the fields defined as follows:

RWE = Ready Work Element Identifier
CHN = Chain Field (links a RWE with other RWE's having dispatching affinity with the same address space)
FLGS = Status Flags, etc.
CPRTY = The current dispatching priority of the task with respect to other tasks that also have current dispatching affinity to the same address space. This field can have many different values over time, but begins with and is periodically restored to a value equal to NPRTY described below.
NPRTY = Normal dispatching priority of the task with respect to other tasks also having normal dispatching affinity to the same address space. Normal dispatching priority is assigned to the task when the task is created and generally remains unchanged during the existence of the task. This is the expected dispatching priority of the task within the address space which, as will be hereinafter understood, is subject to change, at which point the CPRTY dispatching priority becomes controlling.
EPRTY = Escalated dispatching priority that, when set, overrides current dispatching affinity and forces the assigned affinity to the MVS master address space.
CASCB = Current dispatching affinity of the task. This is the latest assigned address space affinity (and priority) of the task.
NASCB 32 Normal dispatching affinity of the task. This is the address space affinity assigned to the task at the time the task was initially created and generally remains unchanged during the existence of the task.
HASCB = Home address space in which the task was created and initially executes.
TCB = Task Control Block (the dispatchable unit).

As can be seen from above, the CASCB and NASCB fields relate to dispatching affinity between a task (a dispatchable unit) and some address space and thus define the address space dispatching priority assigned to the task. The CPRTY and NPRTY fields pertain to task priorities within an address space. The HASCB field identifies the address space in which the task was created and is not related to dispatching priority.

When a work unit is made ready for dispatch, it is associated with the ASCB to which it has current dispatching affinity rather than a predetermined Home ASCB, as is presently the case with MVS. Such work units are also prioritized within the same address space with respect to other work units that have the same dispatching affinity.

An RWE is a globally addressable dispatcher queuing element intended to represent only TCB's that are ready for dispatch. As shown in FIG. 4, each ASCB contains a linked list representing tasks that are ready for dispatch. RWE's are listed in current dispatching priority order (CPRTY) in a list called "ASCB Ready Work Queue".

Figure 2:
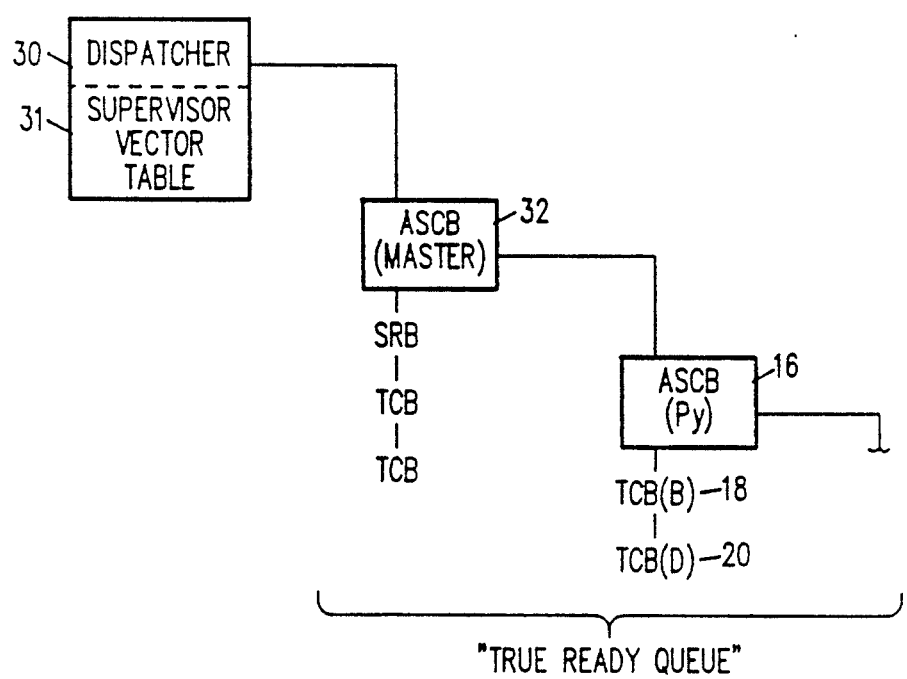
FIG. 2 is a schematic indicating a true ready queue and the functioning of a dispatcher module in accessing ASCB's within the true ready queue.

The RWE field HASCB indicates where the task was created and initially executes, and where the work unit (TCB) is to be found. In this manner, when dispatcher 30 (See FIG. 2) accesses its true ready queue of ASCB's, it will find the dispatchable units within the ASCB Ready Work Queue, associated with some prioritized ASCB, rather than invariably being associated with the ASCB for the address space where they initially execute.

As indicated above, one unit of dispatch within MVS is the TCB. Another unit of dispatch is the service request block (SRB) that typically represents a high performance, supervisor state activity. TCB mode applications are generally less privileged than SRB mode applications. When an SRB is scheduled for dispatch within an address space, it is dispatched as the highest priority unit of work within that address space. All TCB's within an address space have lower dispatching priority than any local SRB's scheduled to the same space.

When a work unit is made available for dispatch, its RWE is placed in the ASCB Ready Work Queue, either associated with the ASCB indicated by the current dispatching affinity field (CASCB) or, with the ASCB for the MVS Master address space (assigned the highest priority in the system). The latter priority is indicated by a non-zero value appearing in the escalated dispatching priority field (EPRTY) which indicates that the work unit is given a special priority.

The importance of the EPRTY capability lies in its ability to raise the dispatching priority of special, highly serialized system code sequences for the purpose of completing and exiting processing as quickly as possible to reduce contention for the affected code sequence. The establishment of temporary priority dispatching affinity with MVS Master address space is also an implicit signal to the dispatcher to treat an affected work unit in a special way while this condition is recognized. When so indicated, the dispatcher, after an interrupt, can elect to allow an interrupted task to continue to completion rather than preempt the interrupted task and make a task switch. This can result in work units experiencing a reduction in preemption during such critical code sequences, by delaying a task switch until the effected code sequence has completed and priority dispatching associated with current dispatching affinity is reenabled.

Figure 5:
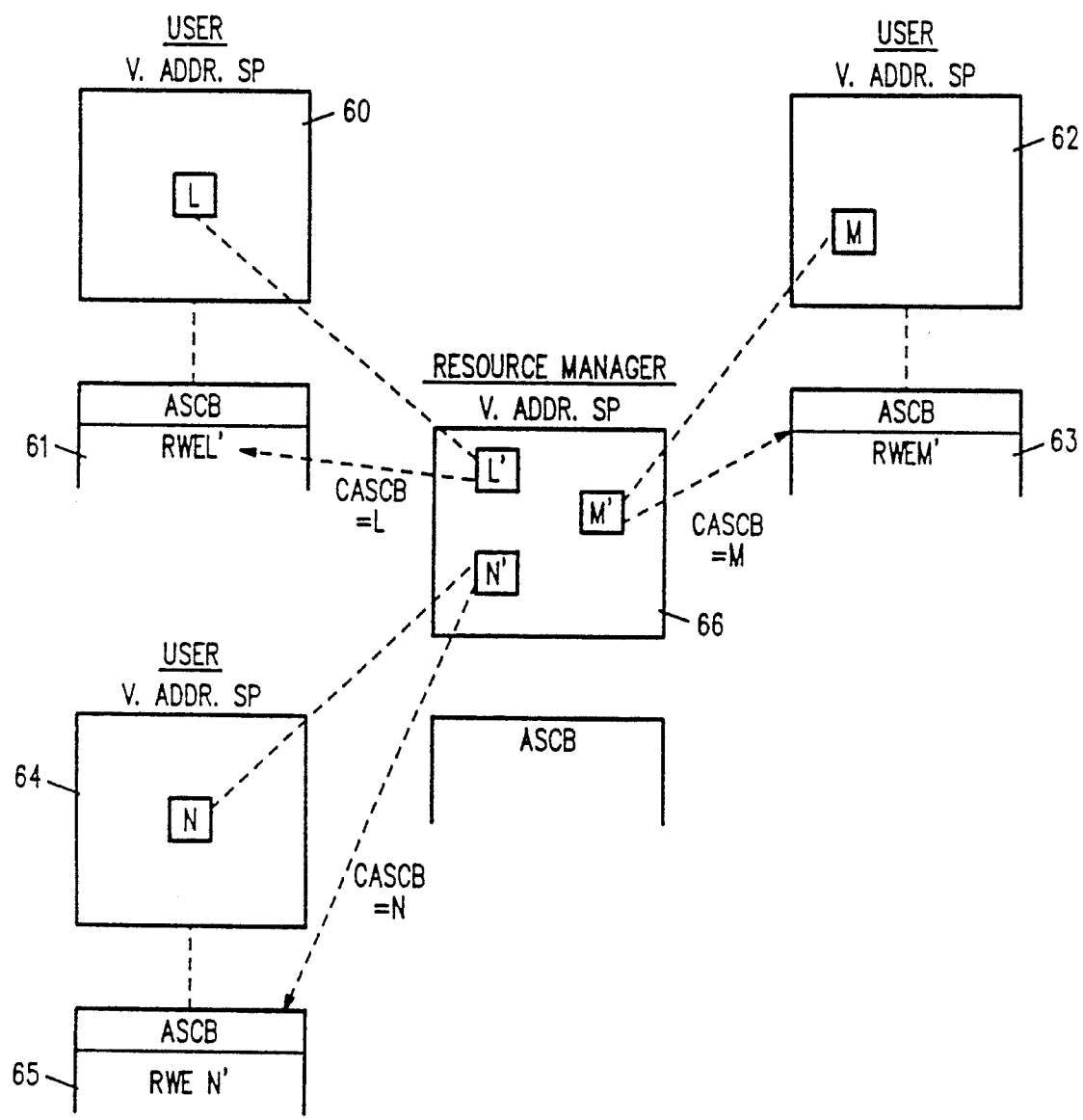
FIG. 5 is a schematic illustrating the operation of the invention where RWE's are employed.

Turning now to FIG. 5, an example will be presented to enable a fuller understanding of the invention. It is assumed that three user virtual address spaces 60, 62 and 64 have been established and that they are respectively running tasks L, M, and N. In this example, each task has made a work request to a resource manager (e.g., a data base manager) running in its own resource manager address space 66. Within address space 66, tasks L', M' and N' are established and are executed in response to calls from tasks L, M and N. When each of those tasks becomes dispatchable, the corresponding RWE is examined to determine the address space to which current dispatching is assigned. The ASCB for the address space is found in the CASCB field in the RWE. Assuming, in each case, that the CASCB field indicates the service requestor's address space (NASCB), then the RWE associated with the TCB for each of the aforesaid tasks is placed on the ASCB Ready Work Queue for each respective service requestor. Thus, the RWE for dispatchable unit L' is placed on the ASCB Ready Work Queue for ASCB 61, associated with address space 60. When the ASCB Ready Work Queue for ASCB 61 is examined by the dispatcher, it will find the RWE for task L' and will further find that its home ASCB (HASCB) is different from CASCB. It will look to HASCB for the actual unit of work that is to be dispatched. Similar actions occur with respect to dispatchable units M' and N' in ASCB Ready Work Queues for ASCBs 63 and 65, associated with address spaces 62 and 64, respectively.

The dispatcher, in examining its true ready queue, looks at the top ASCB, typically the master ASCB, and in it finds a chain of one or more RWE's, each representing a unit of work to be allocated to the processor for some period of time. Within each ASCB Ready Work Queue, it removes the highest priority RWE (as indicated by CPRTY) and dispatches the associated unit of work. Since the ASCB's are chained in priority order, the RWE's are accessed in the priority of their associated address space as well as their internal priorities within the address space.

As is known, multiprogrammed data processing systems improve system performance through concurrent activities in the computer. While some programs are CPU-bound, others are I/O bound and still others may require very large amounts of main storage. An increase in total system throughput can be realized by scheduling a variety of these program types for execution at the same time. Better resource utilization is achieved by overlapping CPU and I/O operations, reducing total program execution time of the programs then had they processed sequentially.

The resulting concurrency brought about through multiprogramming inevitably leads to the need for sharing certain objects in the operating system. Updating a data structure from one consistent state to another typically involves changes to several fields in the structure being altered, and often, more than one structure is involved in any given update. Updating shared data structures requires that access be regulated in some way so that multiple programs do not update the same structure at the same time, and readers of these structures are protected from inconsistencies arising from updates that may be concurrently ongoing.

Well-known mechanisms for regulating access to shared objects in the operating system are called "locks" or "latches". These are serialization mechanisms that are logically associated with a particular resource or structure to be shared. Locks and latches serve essentially the same function, with latches providing a more efficient, lower level set of primitives that are used to serialize access to performance-critical resources. For purposes of exposition however, the terms "lock" and "lock manager" and "latch" and "latch manager" are used interchangeably to describe both locks and latches and their respective resource managers, since the differences between them are not relevant to this discussion.

By convention, when a shared resource needs to be accessed, its associated lock is first requested before attempting to read or alter the resource. Requests for a lock typically indicate an access mode (e.g., Exclusive mode or Shared mode) that corresponds to the access intent (update or read only) of the requesting work unit. The holder of a lock in the Exclusive mode is the only work unit allowed to read and update the corresponding resource while the lock is held. A lock held in the Shared mode allows only reading by any of the work units holding the lock.

The lock manager grants the lock to the requesting work unit if it has not already been granted to some other work unit in an incompatible mode. An unconditional request for an already held lock causes the requesting work unit to be placed on a wait queue for that lock, until the request can be granted. The lock manager then waits until signalled that the lock has become free. Once granted, the requesting work unit holds the lock until it can safely allow other work units access to the associated object being read or updated. When there are no waiters, freeing of a lock causes the lock to become available to future requestors. Otherwise, the lock is granted to one or more waiting work units, depending upon the access mode being granted. The order in which work units are granted a lock is usually based on implementation of the particular lock manager. For example, locks can be granted in the order in which the lock requests are received or the order can be determined by the relative dispatching priorities of the waiters.

Another known serialization technique is to assign ownership of a selected set of resources to a particular work unit or "service process", such that access to any of the owned resources is always performed by programs running serially under this specially dedicated work unit. A service process responds to requests for work placed on a connected input work queue and sequentially routes control to the programs that will access the resource(s) owned by the service process. Upon receiving control, these programs run from start to completion and then return control to the service process. The service process may then resume the work unit that made the request for work if the completed request was synchronous (i.e., the requestor is waiting to be signalled when the requested work has completed). The service process repeatedly selects requests from its input work queue and routes control to the corresponding programs. The service process waits for work when the input work queue is empty. Since only a single program runs under a service process at a time and access to a particular set of resources only occurs under their owning service process, resource serialization is safely assured.

These serialization mechanisms, by their very nature, are intended to selectively block concurrency in the operating system, forcing certain units of work to wait for the availability of a shared resource whenever contention for the resource arises. This can create significant processing delays when a resource is held by a work unit with a low priority. Such an occurrence results in higher priority work units to having to wait for access to the resource.

For shared resources having a particularly high level of activity, significant delays can occur even among work units having the same dispatching priorities through something called "the convoy phenomenon". This can happen when multiple work units need to repeatedly update the same critical resource. They first acquire a latch, make their updates to the resource and then release the latch. If any of these work units are preempted while holding the latch, other work units also requiring access to that resource soon stack up behind the preempted latch holder, waiting for the latch to be freed. When the latch holder is redispatched, it completes its updates and frees the latch, granting it to the next waiter on the queue. After a short time however, the latch is again requested by that same work unit due to the high contention for the corresponding resource. But, because the latch is now likely to be held by one of the waiters at the time the requestor previously held the latch, the requesting work unit gets placed at the end of the wait queue for the latch, establishing the initial convoy cycle. Once established, this resource blocking dispatching behavior perpetuates itself, degrading performance of all work units involved in the cycle and causes these types of critical latches to become bottlenecks in the system.

Figure 6:
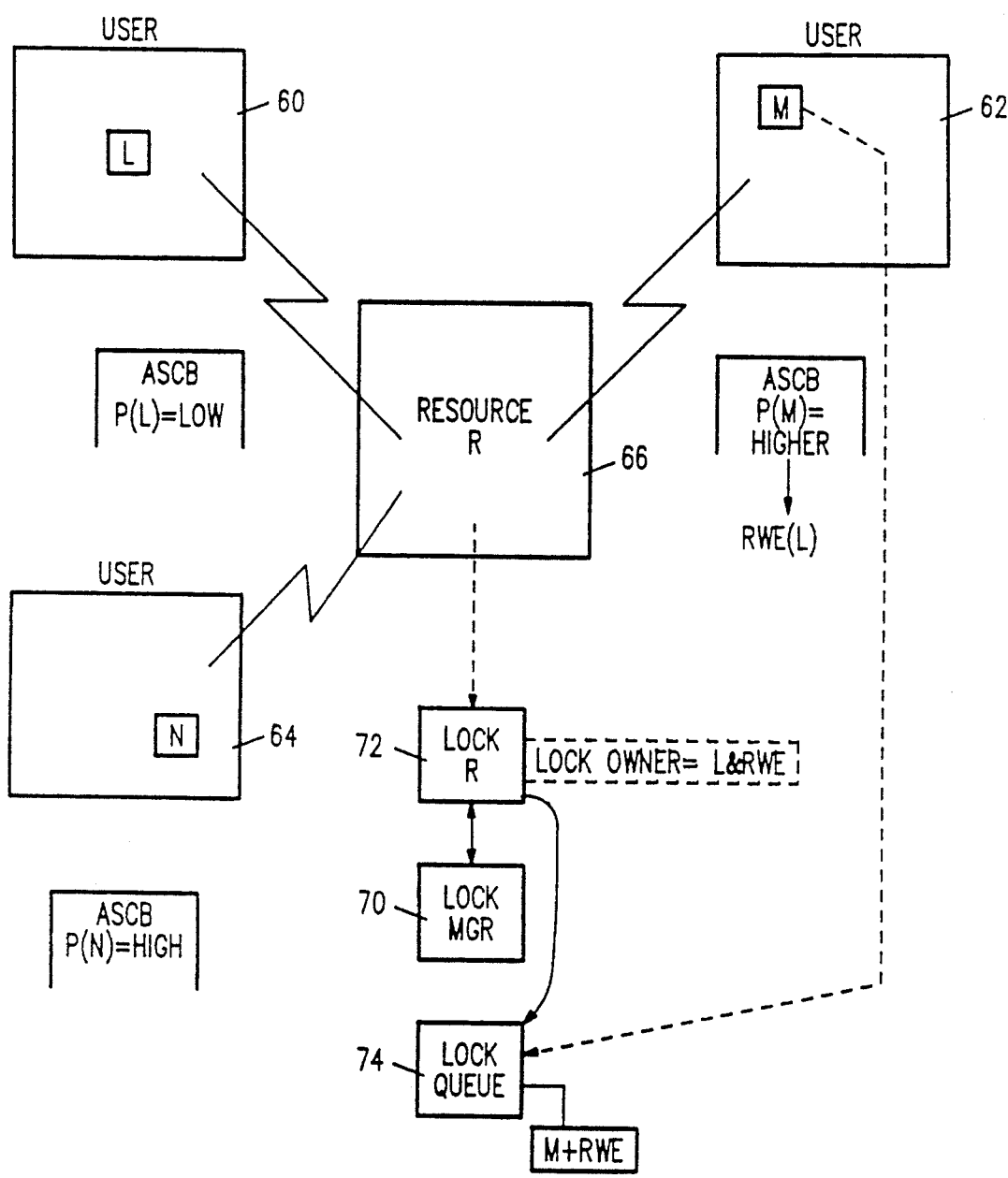
FIG. 6 is a schematic illustrating the operation of the invention as it applies to locking.

This problem can be better understood by referring to FIG. 6. Work units L, M, and N are shown to be executing in a address spaces 60, 62, and 64, respectively, with each having a need to access a shared resource R. It is assumed in the figure that address space 60 is assigned a low priority, address space 62 assigned a higher priority and address space 64 assigned the highest priority (among the three address spaces). Work unit L, executing in address space 60 requests and is granted the lock protecting resource R, allowing work unit L to begin its updates to resource R.

When granting a lock the lock manager also creates a structure to represent the lock (if one doesn't already exist) and records the lock owner (the grantee) and a pointer to its RWE in the lock structure.

Because of the low priority assigned to the address space, when an interrupt occurs, work unit L is preempted by some other higher priority work unit ready for dispatch. Once preempted, control is routed to all other ready work having higher priority, with each program either running to completion, or being preempted by another work unit having a yet higher priority or, running to some point where program execution can no longer continue until the occurrence of some awaited event (e.g., completion of an I/O request), at which time control is returned to the operating system.

Ultimately, work unit L is redispatched when address space 60 becomes the highest priority address space in the system (e.g.., all higher priority work is awaiting I/O) but still remains subject to preemption when higher priority work does become ready for dispatch.

Work unit M, executing in address space 62 now prepares to also access resource R by making an unconditional request for the same lock still held by work unit L. Since the lock is already held, the lock manager places work unit M on the wait queue for the lock and work unit M is made to wait for the lock to become available.

The invention enables the lock manager to alter the priority of the lock owner to lessen delays which would otherwise result from the above noted situation. The lock manager performs the actions illustrated in FIG. 7 to effect the upward adjustment of priority of the lower priority work unit (lock owner). This causes that work unit to be temporarily handled at the same priority level as the high priority waiter for the duration the lock is held by that owner.

The lock manager, upon being called under work unit M to acquire the lock, determines that the lock is already held and places work unit M on the wait queue for the lock. Before waiting for the lock to become available however, the lock manager first compares the dispatching priority of the lock owner with the dispatching priority of caller. (Dispatching priority of an address space is recorded in the ASCB for each address space.) The lock manager determines the lock holder's dispatching priority by locating the Ready Work Element (RWE) of the owning work unit via the lock ownership fields in the lock structure. The CASCB field of the RWE points to the ASCB for the address space to which the work unit has current dispatching affinity.

The lock manager determines the lock requestor's current dispatching priority by locating the RWE associated with the caller's work unit (in this case work unit M). Whenever a work unit is dispatched and running in MVS, the address of the executing work unit is established and made accessible by the operating system to programs running under that work unit. Thus, the RWE for the caller's work unit is found via that work unit. The CASCB field of the RWE is used to locate the ASCB for the address space to which the caller's work unit has current dispatching affinity.

The two ASCB priorities are compared and, if the dispatching priority of lock requestor M is higher than the priority of the lock owner L, lock manager, running under work unit M, changes the CASCB field in the RWE of lock owner L to a value equal to that contained in that same field in the RWE for M. This action gives lock owner L, current dispatching affinity to the same address space to which lock requestor M also has current dispatching affinity, thus causing their dispatching priorities to be also equal.

Next, the lock manager sets a flag (or mark) in the ASCB for the address space to which the lock owner previously had current dispatching affinity, indicating that there may be obsolete RWEs on its ASCB Ready Work Queue. This is a signal to the dispatcher that a scan of the associated ASCB Ready Work Queue is necessary to search for RWEs that no longer belong on that queue (i.e., to find any RWE whose current dispatching affinity has been altered).

Note that the RWE for a work unit will reside on the ASCB Ready Work Queue for the address space to which the corresponding work unit has current dispatching affinity, only while that work unit is ready and waiting to be dispatched. Once a work unit is selected for processing, its RWE is removed from the ASCB Ready Work queue before being dispatched for execution. Thus, if lock owner L was dispatched and running at the time its current dispatching affinity was changed by lock manager on behalf of some higher priority lock requestor M, the change in dispatching affinity would simply cause work unit L to now be associated with the same ASCB Ready Work Queue as lock requestor M and not have any dispatching effect until it is preempted and must undergo redispatch. A search in this case by the dispatcher in response to the "queue obsolete" indicator would result in no obsolete RWEs found on the queue.

Figure 7:
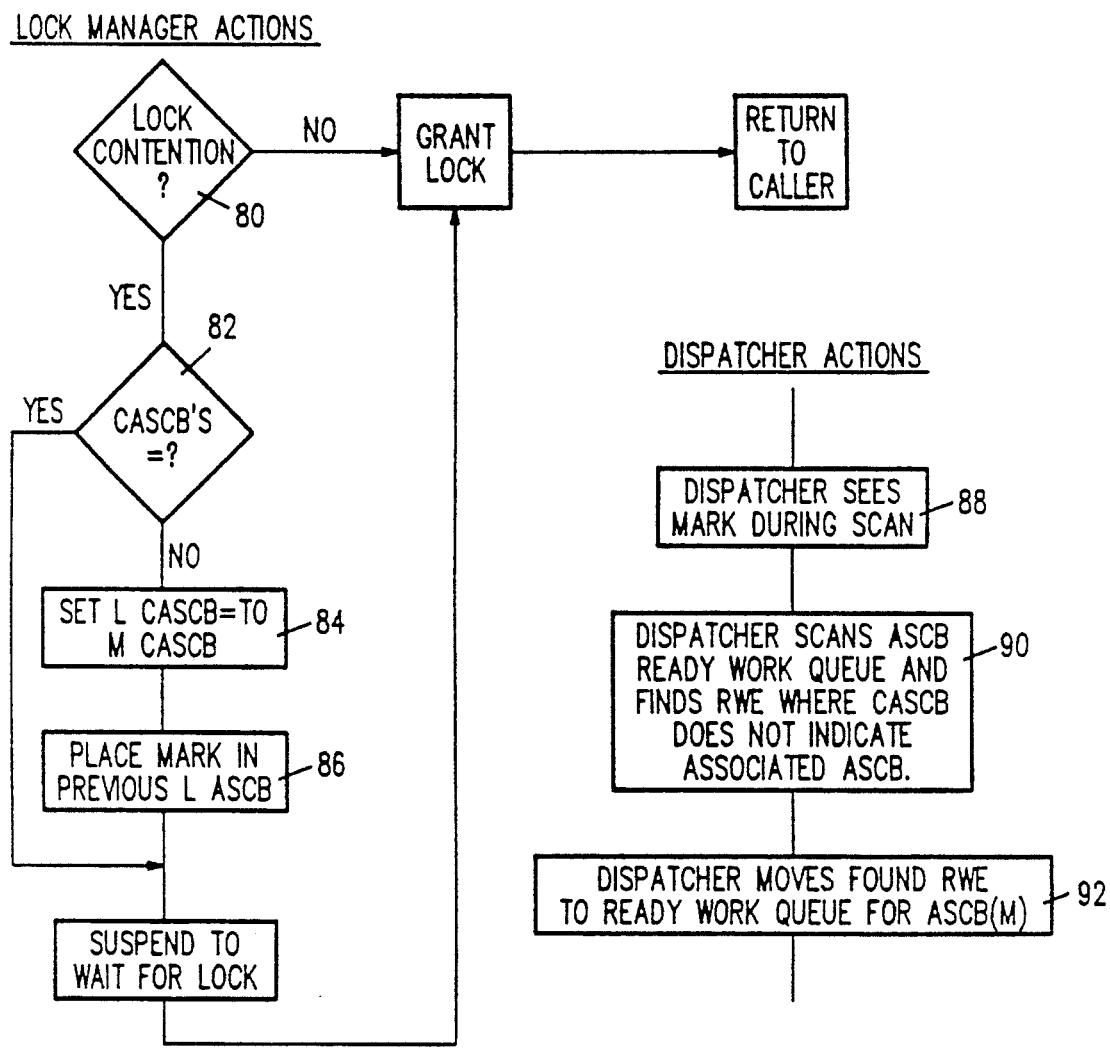
FIG. 7 is a high level flow diagram helpful in understanding the operation illustrated in FIG. 6.

Obsolete Ready Work Elements on an ASCB Ready Work Queue are recognized by the dispatcher as simply those RWEs having their CASCB field pointing to some other ASCB than that ASCB with which the Ready Work Queue is associated. This inconsistency is corrected during a subsequent scan by the dispatcher 30 (FIG. 2) when it sees a "queue obsolete" flag set in the ASCB (FIG. 7, Box 88). At that point, it scans the ASCB· Ready Work Queue searching for obsolete RWEs, where their CASCB points to an ASCB for some other address space (FIG. 7, Box 90). Each such RWE found is removed from the ASCB Ready Work Queue being scanned and placed on the ASCB Ready Work Queue for the ASCB now pointed to by the CASCB field in the RWE being moved. Finally, the "queue obsolete" flag is cleared for the ASCB Ready Work Queue when no RWEs can be found on that queue that should reside on other ASCB Ready Work Queues.

In this manner, a lower priority of a lock holder can be elevated equal to a higher priority of a lock requestor; the lock holder's RWE is moved to the ASCB Ready Work Queue associated with the requesting work unit; and the moved RWE is then selected for the purpose of dispatching work according to its newly assigned priority (relative to the priority of other ready work on that queue).

In a similar way to that already described for a lock manager, the invention enables service providers that serialize access to resources under a common service process (work unit) to maintain the priority of that work unit equal to the highest priority of any of the waiters for work on its input work queue.

The service provider, running under the requestor's work unit, validates and encodes a caller's request and places the encoded request on the input work queue of the service process work unit where the requested work will run. If idle, the service process work unit is signalled of the placement of new work on its input work queue and the service requestor's work unit is made to wait pending completion of the requested service if the service in synchronous.

By making the RWE for the service process work unit accessible to all components of the service provider, the invention allows each service provider to first compare the dispatching priority of the work unit under which the service request was made, with the dispatching priority of the work unit under which the requested work will run, before making the requestor's work unit wait for completion of the request. If the current priority of the caller's work unit is greater, the service provider, running under the work unit of the caller, changes the content of the CASCB field in the RWE for the service process work unit to a value equal to that contained in that same field in the RWE for the caller's work unit. As with the lock manager, these actions give the service process work unit dispatching affinity to the address space of the highest priority waiter thus causing their dispatching priorities to also be equal.

Figure 8:
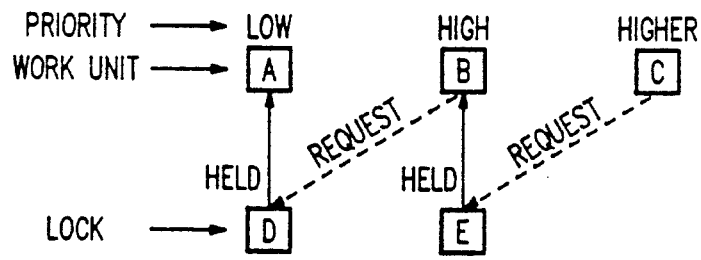
FIG. 8 is a schematic illustrating locking where multiple locks are involved.

Referring now to FIG. 8, an extension is shown of the priority alteration method, when various work units request locks held by other work units of differing priority. The situation shown in FIG. 8 assumes that work unit A holds lock D while work unit B holds lock E. It further assumes that work unit B has a higher priority than work unit A and also requests lock D. As a result of the procedure noted in FIG. 7, the priority of work unit A will be increased to the level of work unit B, thereby assuring that work unit B is not delayed by the lower priority of work unit A. However, if B also holds lock E and a request for lock E is made by an even higher priority work unit C, then the system operates as follows: first, in accordance with the above noted procedure, the priority of work unit B is increased to that of higher priority work unit C.

When raising the priority of work unit B, the lock manager recognizes that work unit B has requested and is awaiting the availability of lock D and, that work unit B is blocked in turn, by work unit A so long as work unit A holds lock D.

Clearly, work unit C is blocked, as well, by work unit A and no amount of manipulation of the priority of work unit B can have an effect on processing delays that are caused by work unit A. Therefore, the newly elevated priority established for work unit B cascades to work unit A, also increasing its priority to equal that of work unit C. In this manner, higher priority work units can be assured that their lock requests will not cause them to be indirectly blocked by lower priority work units.

Some reasonable limit must be placed upon the number of work units to which a given priority increase can cascade, so as to prevent undue processor time being spent on the maintenance of these temporary elevated priorities. A reasonable limit is one which, if exceeded, would cause more resources to be consumed than would be expected to be saved. However, there may be situations where additional priority increases are called for, and the process of this invention clearly contemplates the provision of such.

In coupled system environments, multiple individual processors are often connected together via a communications mechanism with each processor operating under the control of its own operating system. In such systems, the RWE described above can be used to enhance the management of work unit priorities when a work request is processed on a different processor than the processor in which the request was made. Today, under MVS, the dispatching priority at which a work unit is dispatched is generally determined by the Home address space within the host operating system where the work unit executes. This occurs even when the work unit is created to process a work request from some other work unit executing on a different processor in the complex. Here again, a disparity in dispatching priorities between the remote-originating work unit and the local work unit created in response to a remote request, can create the same type of CPU allocation problems as occurs between address spaces within a single operating system.

The above-described problem can be overcome through the use of the RWE and by the provision of an additional queueing structure in each operating system. The queueing structure comprises a series of adjacent Remote Priority Queue Header (RPQH) blocks, each block having assigned a unique priority level. Thus, if there are 256 priority levels in the system, there will be 256 corresponding RPQH blocks, each block having one of the 256 priority levels assigned to it.

Figure 9:
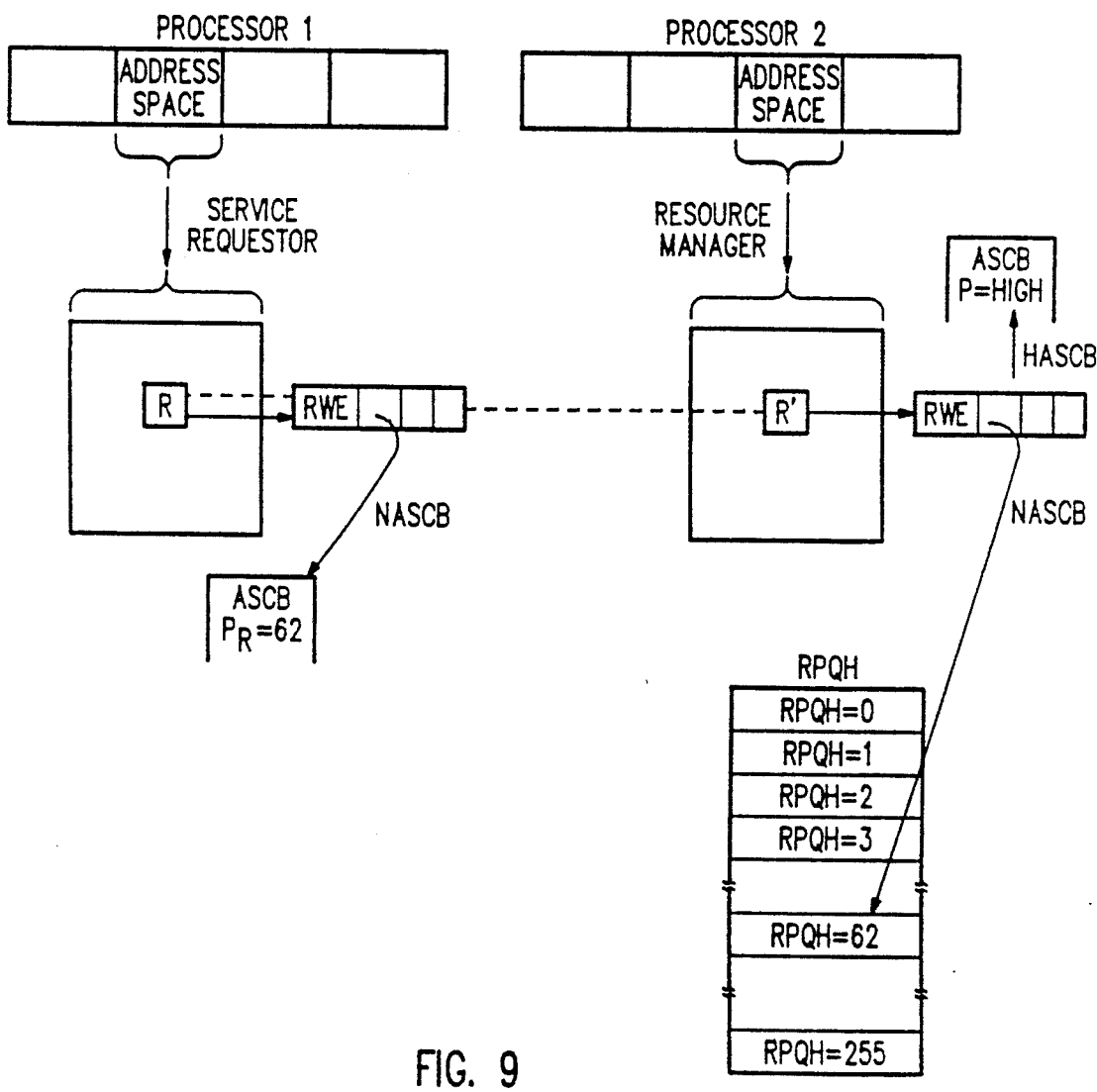
FIG. 9 is a schematic illustrating the operation of the invention in a coupled multiprocessor environment.

Turning to FIG. 9, the function of the RPQH is illustrated as it pertains to connected processors P1 and P2. It is assumed in the figure that work unit R, executing on processor P1, transmits a request for some service to processor P2, where work unit R' is established in response to that request. Construction of the work request includes, in part, extracting the dispatching priority of the requesting work unit R executing on processor P1, to be sent to processor P2 along with the request for work. For illustration purposes, FIG. 9 assumes that work R is assigned priority 62. When work unit R' is created on processor P2, an RWE is also created and associated with R'. The dispatching priority value extracted from R and passed with the request for work, is used to locate the address of the associated RPQH which is then stored in the Normal Dispatching Affinity (NASCB) field of the RWE. Dispatching priority 62 is thereby assigned to work unit R' by giving R' "Remote Dispatching Affinity" to the address space to which work unit R has current dispatching affinity.

When work unit R' is initially made ready for dispatch in processor P2, the Current Dispatching Affinity (CASCB) field of its RWE is set equal to its Normal Dispatching Affinity (NASCB), which is the address of the RPQH block for remote priority 62. When work unit R' becomes ready for dispatch, its RWE is placed on the dispatcher queue belonging to the RPQH block addressed by the Current Dispatching Affinity (CASCB) field of the RWE. If the dispatcher queue was previously empty when the RWE was enqueued, the dispatcher places the RPQH block in the appropriate position on the ASCB True Ready Queue. Thus, the ASCB True Ready Queue is now interspersed with ASCB's and RPQH's that are ordered according to their assigned dispatching priorities. As a result, work unit R' will be dispatched for execution when the dispatcher queue for RPQH 62 contains the highest priority ready work in the system and, when the RWE for R' represents the highest ready work on that dispatcher queue. As with ASCB's, RPQH blocks appear in priority order on the True Ready Queue only when its dispatcher queue contains work ready for dispatch. When preparing to dispatch the associated work unit for execution and the last RWE is removed from a dispatcher queue (e.g. the queue is now empty), the RPQH is removed from the True Ready Queue since its dispatcher queue no longer contains any ready work.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A computer system including system control software, said software including means for establishing address spaces, each established address space having an assigned priority, said system including service requestor and resource manager address spaces, said computer system comprising:
    means for establishing a dispatchable work unit in a resource manager address space in response to a work request from a service requestor address space;
    means for creating an encoded ready work element (RWE) for said dispatchable work unit, said RWE including an affinity field indicating said service requestor address space;
    control block means associated with each service requestor address space, each control block means having chained therewith RWE's of dispatchable work units whose affinity fields indicate, directly or indirectly, said associated service requestor address space; and
    dispatcher means for examining each said control block means and enabling dispatch for execution of ready work units having RWE's chained therein, at the priority of the associated service requestor address space.

2. The computer system as recited in claim 1, wherein each control block means is an address space control block (ASCB), each said ASCB enabling access to a chained list of RWE's for work units that are ready for dispatch.

3. The computer system as recited in claim 2, wherein each said RWE has a dispatching priority field, and each ASCB enables access to a chained list of RWE's for dispatchable work units in decreasing order of dispatching priority indicated by said dispatching priority field.

4. The computer system as recited in claim 3, wherein said dispatcher means accesses ASCB's and work units that are accessible therefrom, examines said ASCB's in decreasing order of associated address space priority and said RWE's in decreasing order of dispatching priority within said associated address space.

5. The computer system as recited in claim 1, wherein each said RWE includes an escalated dispatching priority field (EPRTY), said EPRTY overriding an affinity field indicating said user address space and indicating affinity to a higher priority address space, whereby dispatch of a work unit associated with said RWE occurs at the priority of said higher priority address space.

6. The computer system as recited in claim 5, wherein said higher priority address space exhibits the highest priority in the computer system.

7. A computer system including system control software, said software including means for establishing virtual address spaces, each virtual address space having an associated address space control block (ASCB) and an assigned priority level, said system comprising:
    means for establishing a dispatchable unit of work in a resource manager's virtual address space in response to a work request from a service requestor virtual address space;
    means for creating an encoded ready work element (RWE) for said dispatchable unit of work, said RWE including a normal affinity field indicating said service requestor virtual address space, and a current affinity field initially set equal to the normal affinity field;
    means responsive to said work unit being ready for dispatch from said resource manager address space, for causing the RWE of said dispatchable unit to be added to a chained list from the ASCB that is associated with said service requestor virtual address space, if the current affinity field of said RWE indicates said ASCB; and
    dispatch means for examining ASCB's that indicate chained RWE's of dispatchable units, said examining occurring in order of priority of the associated virtual address space for each ASCB, whereby said dispatch means finds said RWE of said dispatchable unit at the priority of said service requestor virtual address space.

8. The computer system as recited in claim 7, further comprising:
    means for assigning a lock to a first unit of work;
    means responsive to a second unit of work from a virtual address space of higher priority requesting said lock, to modify the current affinity field of the RWE associated with said first unit of work to indicate said higher priority address space; and
    means responsive to said first unit of work being dispatchable, for causing the RWE of said first unit of work to be included in the chained list of RWE's from the ASCB associated with said higher priority virtual address space, whereby said dispatch means finds said RWE for said dispatchable first unit of work at the priority of said higher priority address space.

9. The computer system as recited in claim 8, further comprising:
means responsive to said modification of a current affinity field of an RWE, to place a mark in the ASCB associated with said virtual user address space, whereby said dispatch means, upon examination of said ASCB, finds said mark, scans RWE's chained therefrom to find an RWE whose current affinity field is not equal to said ASCB, and causes any such RWE to be chained from the ASCB then indicated by the current affinity field of said RWE.

10. A computer system as recited in claim 7, further comprising:
means for assigning a lock to a first requesting unit of work from a first address space;
means responsive to a second unit of work from said first address space but of higher priority within said first address space than said first requesting unit of work, to modify a current priority field of a RWE associated with said first unit of work to indicate said higher priority of said second unit of work; and
means responsive to said first unit of work being dispatchable, for causing the RWE of said first unit of work to be repositioned in a chained list of RWE's in which it already appears, but modified according to the new current priority value, whereby said dispatch means finds said RWE for said dispatchable first unit of work at the priority of said higher priority second unit of work.

11. A computer system as recited in claim 10, further comprising:
means responsive to said modification of a current priority field of a RWE, to place a mark in the ASCB associated with the then current affinity field of the RWE, whereby said dispatch means, upon examination of said ASCB, finds said mark, scans RWE's chained therefrom to find an RWE whose current priority field has a value greater than the corresponding value in the preceding RWE on said chain, and causes any such RWE to be rechained on the same priority chain but now ordered according to the new value of the current priority field.

12. The computer system as recited in claim 7, wherein said user and resource address spaces are in first and second coupled processors controlled by independent operating system softwares respectively; said second processor containing said resource manager address space and further comprising:
remote priority queue (RPQH) means comprising a plurality of blocks with assigned priorities;
means for chaining a RWE for a work unit that is ready for dispatch from said resource address space, in a block of said RPQH means that has an assigned priority value equal to the priority value of the address space indicated by said RWE's current affinity field; and
dispatch means in said second processor for examining the RPQH means in conjunction with ASCB's associated with address spaces having dispatchable work units, said RPQH means examined in accordance with said assigned priority values, whereby any RWE listed therein is dispatched in accordance with said assigned block priority value.

13. The computer system as recited in claim 7, further comprising:
means for restricting access to a resource manager first unit of work because said resource manager first unit of work is busy providing service to a second unit of work;
means responsive to a third unit of work from a virtual address space of higher priority requesting service from said first unit of work, to modify the current affinity field of the RWE associated with said first unit of work to indicate said higher priority address space associated with said third unit of work; and
means responsive to said first unit of work being dispatchable, for causing the RWE of said first unit of work to be included in the chained list of RWE's from the ASCB associated with said higher priority virtual address space, whereby said dispatch means finds said RWE for said dispatchable first unit of work at the priority of said higher priority virtual address space.

14. The computer system as recited in claim 13, further comprising:
means responsive to said modification of a current affinity field of an RWE, to place a mark in the ASCB that was indicated by said current affinity field prior to said modification, whereby said dispatch means, upon examination of said ASCB, finds said mark, scans RWE's chained therewith to find an RWE whose current affinity field does not indicate said ASCB and causes any such RWE to be chained from the ASCB indicated by the current affinity field of said RWE.

15. A computer system including system control software, said software including means for establishing address spaces, each established address space having an assigned priority, said system including service requestor and resource manager address spaces, said system performing the method comprising:
establishing a dispatchable work unit in a resource manager address space in response to a work request from a service requestor address space;
creating an encoded ready work element (RWE) for said dispatchable work unit, said RWE including an affinity field indicating said service requestor address space;
creating an address space control block (ASCB) for each service requestor and resource manager address space, for chaining RWE's of dispatchable work units whose affinity fields indicate the respective ASCB that is associated with a said service requestor address space; and
examining each said ASCB and enabling dispatch, for execution, of ready work units having RWE's chained therewith at the priority of the associated address space.

16. The computer system as recited in claim 15, wherein each said RWE has a dispatching priority field, and each ASCB enables access to a chained list of RWE's for dispatchable work units in decreasing order of dispatching priority indicated by said dispatching priority field.

17. The computer system as recited in claim 16, wherein said examining step accesses ASCB's and work units to which access is enabled thereby, and examines said ASCB's in decreasing order of associated address space priority and said RWE's, chained with each ASCB, in decreasing order of dispatching priority with respect to the address space associated with an ASCB.

18. The computer system as recited in claim 16, wherein each said RWE includes an escalated dispatching priority field (EPRTY), said EPRTY overriding an affinity field indication in said RWE and indicating affinity to a higher priority address space, whereby dispatch of the work unit associated with said RWE occurs at the priority of said higher priority address space.

19. A computer system as recited in claim 18, wherein said escalated priority field signals a dispatcher that if the associated work unit is interrupted and there is a higher priority work unit awaiting dispatch, that said dispatcher may temporarily ignore said higher priority work unit until said escalated priority field is reset.

20. The computer system as recited in claim 16, said method further comprising:
  restricting access to a first work unit with current affinity to a first address space;
  responding to a second work unit from an address space of higher priority requesting access to said first work unit, by modifying the current affinity field of the RWE for said first work unit to indicate said higher priority address space; and
  when said first unit of work is dispatchable, causing the ASCB associated with said higher priority address space to enable access to said RWE of said first unit of work, whereby said dispatch means finds said RWE at the priority of said higher priority address space.

21. The computer system as recited in claim 20, further comprising:
  responding to a modification of an affinity field of an RWE to place a mark in the ASCB as indicated by said current affinity field prior to said modification, whereby said examining step finds said mark, scans RWE's therewith to find an RWE whose current affinity field does not indicate said ASCB, and moves any such RWE to the ASCB indicated by the current affinity field of said RWE.

22. The computer system as recited in claim 15, wherein said service requestor and resource manager address spaces are in first and second coupled processors controlled by independent operating systems software respectively; said second processor containing said resource manager address space and performing the method of:
  establishing a remote priority queue header (RPQH) means comprising a plurality of blocks with assigned priorities;
  chaining a RWE for a work unit that is ready for dispatch from said resource manager address space, from a block of said RPQH means that has an assigned priority value equal to the priority value indicated by said RWE's current affinity field; and
  examining the RPQH means in conjunction with ASCB's associated with address spaces having dispatchable work units, chains in said RPQH means whereby it is examined in accordance with said assigned priority values, and whereby any RWE listed therein is dispatched in accordance with said assigned priority value.

* * * * *